US012657966B2

(12) United States Patent
Shire et al.

(10) Patent No.: US 12,657,966 B2
(45) Date of Patent: Jun. 16, 2026

(54) VEHICLE DIAGNOSTICS SYSTEM AND METHOD THEREIN FOR ENABLING SYNCHRONOUS REMOTE VEHICLE DIAGNOSTICS FOR A PLURALITY OF VEHICLES

(71) Applicant: VOLVO TRUCK CORPORATION, Gothenburg (SE)

(72) Inventors: Joshua Shire, Gothenburg (SE); Jonatan Gaeskeby-Mars, Winston Salem, NC (US); Prakash Pradhan, Bangalore (IN)

(73) Assignee: VOLVO TRUCK CORPORATION, Gothenburg (SE)

( * ) Notice: Subject to any disclaimer, the term of this patent is extended or adjusted under 35 U.S.C. 154(b) by 381 days.

(21) Appl. No.: 18/049,439

(22) Filed: Oct. 25, 2022

(65) Prior Publication Data

US 2023/0128080 A1 Apr. 27, 2023

(30) Foreign Application Priority Data

Oct. 27, 2021 (EP) .................................... 21205023

(51) Int. Cl.
*G07C 5/00* (2006.01)
*G07C 5/08* (2006.01)

(52) U.S. Cl.
CPC ........... *G07C 5/008* (2013.01); *G07C 5/0808* (2013.01)

(58) Field of Classification Search
None
See application file for complete search history.

(56) References Cited

U.S. PATENT DOCUMENTS

2005/0203673 A1 9/2005 El-Hajj et al.
2007/0086482 A1 4/2007 Pruzan et al.
(Continued)

FOREIGN PATENT DOCUMENTS

CN 103645729 * 3/2014

OTHER PUBLICATIONS

Extended European Search Report in corresponding European Application No. 21205023.1 dated May 4, 2022 (9 pages).
(Continued)

*Primary Examiner* — Hongye Liang
(74) *Attorney, Agent, or Firm* — Jeffri A. Kaminski; Venable LLP

(57) ABSTRACT

A method performed by a vehicle diagnostics system for enabling synchronous remote vehicle diagnostics for a plurality of vehicles is provided. The vehicle diagnostics system obtains information indicating that an application in the vehicle diagnostics system is requesting to perform synchronous remote vehicle diagnostics on a selected vehicle among the plurality of vehicles. The vehicle diagnostics system also determines, by using an Application Programming Interface, API, available in the vehicle diagnostics system, a logical network location of an on-board connectivity device, OCD, integrated in an on-board network of the selected vehicle. Further, the vehicle diagnostics system establishes, using the API, a logical network connection between the determined logical network location of the OCD and the logical network location of the vehicle diagnostics system over a wireless communications network.

8 Claims, 2 Drawing Sheets

(56) References Cited

U.S. PATENT DOCUMENTS

| | | | | |
|---|---|---|---|---|
| 2014/0195102 | A1* | 7/2014 | Nathanson | B60K 35/23 701/31.4 |
| 2014/0200760 | A1 | 7/2014 | Kaufmann et al. | |
| 2020/0178198 | A1 | 6/2020 | Ding et al. | |
| 2020/0259919 | A1 | 8/2020 | Lepp et al. | |
| 2020/0334924 | A1 | 10/2020 | Wells et al. | |
| 2020/0389469 | A1* | 12/2020 | Litichever | H04W 4/40 |

OTHER PUBLICATIONS

European Communication under Rule 71(3) dated Apr. 30, 2024 in corresponding European Patent Application 21205023.1, 37 pages.

* cited by examiner

VEHICLE DIAGNOSTICS SYSTEM AND METHOD THEREIN FOR ENABLING SYNCHRONOUS REMOTE VEHICLE DIAGNOSTICS FOR A PLURALITY OF VEHICLES

TECHNICAL FIELD

Embodiments herein relate in general to remote vehicle diagnostics. In particular, embodiments herein relate to a vehicle diagnostics system and a method therein for enabling synchronous remote vehicle diagnostics for a plurality of vehicles. Also, embodiments herein relate to an on-board connectivity device and a method therein enabling remote vehicle diagnostics to be performed on a vehicle. Furthermore, the embodiments herein also relate to a computer program product, a carrier and a vehicle comprising an on-board connectivity device.

BACKGROUND

Performing diagnostics of a vehicle from a remote location is important in order to be able to establish an understanding at a central location of the condition and update requirements of certain components within a vehicle. This is in order to make centralized decisions regarding maintenance, error fixes, software updates, etc., required by the vehicle. This is particularly useful in case of attempting to effectively manage a fleet of vehicles. Some examples of such vehicles may comprise heavy-duty vehicles, such as, trailers, semi-trailer vehicles, trucks for cargo transport, etc., and working machines, such as, e.g. excavators, fork lifts, loaders, haulers, etc.

In order to perform diagnostics of a vehicle and its components from a remote location, the remote vehicle diagnostics system needs to be able to remotely communicate with an on-board Controller Area Network, CAN, bus over a wireless connection. The CAN bus provides an on-board network connection to various components in the vehicle. According to one example, such a wireless connection may be set up by establishing a private link with the vehicle using a static IP address that is known, or can be predicted, by the remote vehicle diagnostics system. In other words, a private Access Point Name, APN, link over a wireless telecommunications network may be established, wherein the IP addresses are distributed by the remote vehicle diagnostics system or systems connected thereto. In this case, the system(s) may here also be queried by other systems or devices wishing to communicated with the system(s). However, while data may be obtained from the vehicle over the established private APN link using, e.g. event logging, vehicle data reports or data acquisition frameworks, this wireless connection does not permit data to be obtained by a remote vehicle diagnostics system which enables the remote vehicle diagnostics system to perform synchronous, i.e. real-time, vehicle diagnostics.

SUMMARY

It is an object of embodiments herein to provide a remote vehicle diagnostics system and method therein, along with computer program products and a vehicle, for enabling synchronous remote vehicle diagnostics for a plurality of vehicles that seeks to mitigate, alleviate, or eliminate all or at least some of the above-discussed drawbacks of presently known solutions.

According to a first aspect of embodiments herein, the object is achieved by a method performed by vehicle diagnostics system for enabling synchronous remote vehicle diagnostics for a plurality of vehicles. The method comprises obtaining information indicating that an application in the vehicle diagnostics system is requesting to perform synchronous remote vehicle diagnostics on a selected vehicle among the plurality of vehicles. The method also comprises determining, by using an Application Programming Interface, API, available to the vehicle diagnostics system, a logical network location of an on-board connectivity device, OCD, integrated in an on-board network of the selected vehicle. Further, the method comprise establishing, using the API, a logical network connection between the determined logical network location of the OCD and the logical network location of the vehicle diagnostics system over a wireless communications network.

By having a vehicle diagnostics system according to the above, a remote testing application in the vehicle diagnostics system is able to select a specific vehicle for which to perform synchronous vehicle diagnostics, whereby the APIs available to the vehicle diagnostics system in the logical network in which the vehicle diagnostics system operates may be used to establish a logical network connection towards an OCD in the selected vehicle over existing network interfaces of a wireless communications network. Thus, the remote testing application in the vehicle diagnostics system will be communicatively connected to the OCD in the vehicle and thus be able to perform synchronous, real-time remote vehicle diagnostics on the selected vehicle agnostically.

In some embodiments, the method may further comprise transmitting, to the OCD, information indicating that the vehicle diagnostics system is requesting to perform synchronous remote vehicle diagnostics on the vehicle over the established logical network connection. In this case, the method also comprise performing synchronous remote vehicle diagnostics of the selected vehicle via the established logical network connection based on synchronous data information from the OCD originating from on-board vehicle components via the on-board network of the selected vehicle. This means that synchronous real-time data obtained via a variety of different protocols of the on-board network comprising the CAN bus may be transferred agnostically over the established logical network connection and used by the remote testing application in the vehicle diagnostics system. Also, in some embodiments, the API may be adapted to communicate with the OCD by using API libraries, available to the vehicle diagnostics system, capable of supporting network discovery.

In some embodiments, in case the logical network location of the vehicle diagnostics system and the logical network location of the OCD belongs to the same logical network, the determination of the logical network location and establishment of the logical network connection may be performed via an edge node in the wireless communications network, wherein the edge node is adapted to enable communication between separate logical network locations belonging to the same logical network. Thus, an edge node may advantageously facilitate the discovery of the network location of the OCD and bridge the logical network over the wireless communications network. This may, for example, be used in case the vehicle diagnostics system and the OCD are part of the same WiFi network.

Alternatively, according to some embodiments, in case the logical network location of the vehicle diagnostics system and the logical network location of the OCD belongs to separate logical networks, the determination of the logical network location and establishment of the logical network connection may be performed via a cloud server in or connected to a wireless communications network, wherein the cloud server is adapted to enable communications between the separate logical networks using virtual tunneling protocols. Thus, a cloud server may advantageously facilitate the discovery of the network location of the OCD and provide virtual tunnels between the vehicle diagnostics system and the OCD over the wireless communications network. This may, for example, be used in case the OCD is part of a remote logical network compared to vehicle diagnostics system, such as, in remote logical network of a wireless telecommunications network, e.g. a 4G/5G/LTE/6G telecommunications network.

According to a second aspect of embodiments herein, the object is achieved by a vehicle diagnostics system for enabling synchronous remote vehicle diagnostics for a plurality of vehicles. The vehicle diagnostics system is configured to obtain information indicating that an application in the vehicle diagnostics system is requesting to perform synchronous remote vehicle diagnostics on a selected vehicle among the plurality of vehicles. Also, the vehicle diagnostics system is configured to determine, by using an API, available to the vehicle diagnostics system, a logical network location of an OCD integrated in an on-board network of the selected vehicle. Further, the vehicle diagnostics system is configured to establish, using the API, a logical network connection between the determined logical network location of the OCD and the logical network location of the vehicle diagnostics system over a wireless communications network.

In some embodiments, the vehicle diagnostics system may further be configured to transmit, to the OCD, information indicating that the vehicle diagnostics system is requesting to perform synchronous remote vehicle diagnostics on the vehicle over the established logical network connection. In this case, the vehicle diagnostics system may also be configured to perform synchronous remote vehicle diagnostics of the selected vehicle via the established logical network connection based on synchronous data information from the OCD originating from on-board vehicle components via the on-board network of the selected vehicle. Also, in some embodiments, the API may be adapted to communicate with the OCD by using API libraries, available to the vehicle diagnostics system, capable of supporting network discovery.

In some embodiments, in case the logical network location of the vehicle diagnostics system and the logical network location of the OCD belongs to the same logical network, the vehicle diagnostics system may further be configured to determine the logical network location of the OCD and establish the logical network connection via an edge node in the wireless communications network, wherein the edge node is adapted to enable communication between separate logical network locations belonging to the same logical network. Alternatively, in case the logical network location of the vehicle diagnostics system and the logical network location of the OCD belongs to separate logical networks, the vehicle diagnostics system may further be configured to determine the logical network location of the OCD and establish the logical network connection via a cloud server in or connected to the wireless communications network, wherein the cloud server is adapted to enable communications between the separate logical networks using virtual tunneling protocols.

According to a third aspect of embodiments herein, the object is achieved by a method performed by an on-board connectivity device, OCD, for enabling synchronous remote vehicle diagnostics to be performed on a vehicle. Here, the OCD is integrated in an on-board network of the vehicle interfacing with on-board vehicle components. The method comprising establishing a logical network connection between the logical network location of the OCD in a wireless communications network and a logical network location of the vehicle diagnostics system. The method also comprises receiving information indicating that a vehicle diagnostics system is requesting to perform synchronous remote vehicle diagnostics on the vehicle over the established logical network connection. Further, the method comprise providing to the vehicle diagnostics system via the established logical network connection, synchronous data information from the on-board vehicle components obtained via the on-board network of the vehicle.

In some embodiments, in case the logical network location of the vehicle diagnostics system and the logical network location of the OCD belongs to the same logical network, the establishment of the logical network connection may further be performed via an edge node of the wireless communications network, wherein the edge node is adapted to enable communication between separate logical network locations belonging to the same logical network. Alternative, in case the logical network location of the vehicle diagnostics system and the logical network location of the OCD belongs to separate logical networks, the establishment of the logical network connection may further be performed via a cloud server in or connected to a wireless communications network, wherein the cloud server is adapted to enable communications between the separate logical networks using virtual tunneling protocols.

According to a fourth aspect of embodiments herein, the object is achieved by an n-board connectivity device, OCD, for enabling synchronous remote vehicle diagnostics to be performed on a vehicle. The OCD is integrated in an on-board network of the vehicle interfacing with on-board vehicle components. The OCD is configured to establish a logical network connection between the logical network location of the OCD in a wireless communications network and a logical network location of the vehicle diagnostics system in the wireless communications network. Also, the OCD is configured to receive information indicating that a vehicle diagnostics system is requesting to perform synchronous remote vehicle diagnostics on the vehicle over the established logical network connection. Further, the OCD is configured to provide, to the vehicle diagnostics system via the established logical network connection, synchronous data information from the on-board vehicle components obtained via the on-board network of the vehicle.

In some embodiments, in case the logical network location of the vehicle diagnostics system and the logical network location of the OCD belongs to the same logical network, the OCD may be configured to establish the logical network connection via an edge node of the wireless communications network, wherein the edge node is adapted to enable communication between separate logical network locations belonging to the same logical network. Alternatively, in case the logical network location of the vehicle diagnostics system and the logical network location of the OCD belongs to separate logical networks, the OCD may be configured to establish the logical network connection via a cloud server in or connected to a wireless communications network, wherein the cloud server is adapted to enable communications between the separate logical networks using virtual tunneling protocols.

According to a fifth aspect of the embodiments herein, the object is achieved by a computer program comprising instructions which, when executed in a processing circuitry, cause the processing circuitry to carry out the methods described above. According to a sixth aspect of the embodiments herein, the object is achieved by a carrier containing the computer program described above, wherein the carrier is one of an electronic signal, optical signal, radio signal, or computer-readable storage medium. According to a seventh aspect of the embodiments herein, the object is achieved by a vehicle comprising an OCD according to the embodiments described above.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
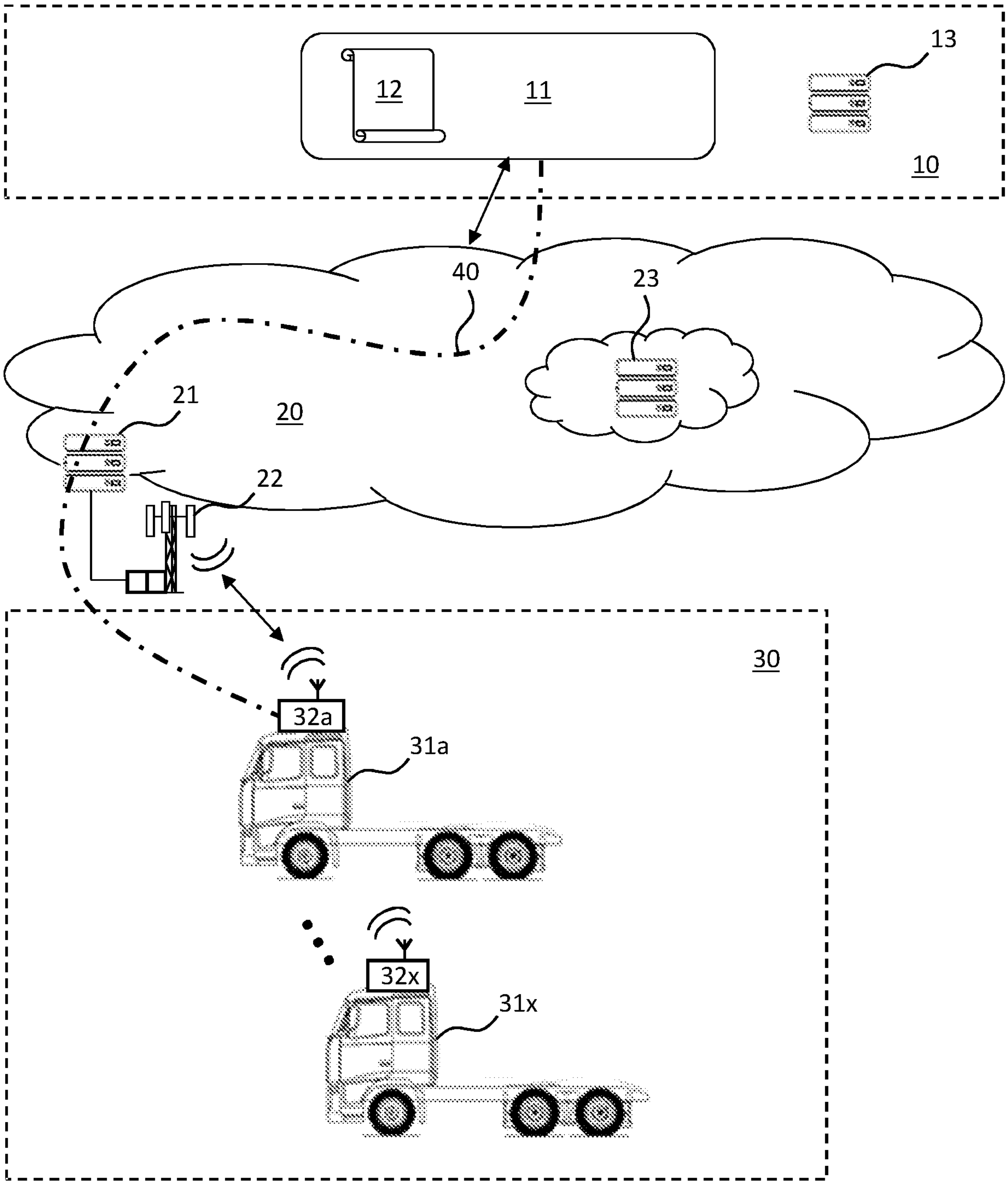
FIG. 1 is a schematic illustration of embodiments of a vehicle diagnostics system and a plurality of vehicles connected to a wireless communications network according to some embodiments.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description. It is to be understood that the present invention is not limited to the embodiments described herein and illustrated in the drawings; rather, the skilled person will recognize that many changes and modifications may be made within the scope of the appended claims.

FIG. 1 illustrates embodiments of a vehicle diagnostics system 11 and a plurality of vehicles 31*a*, . . . , 31*x* connected to a wireless communications network 20.

The vehicle diagnostics system 11 may comprise one or more applications 12. The one or more applications 12 may be one or more remote testing applications or programs being executed and running in the vehicle diagnostics system 11 capable of performing vehicle diagnostics based on data obtained from one or more on-board components of one or more vehicles among the plurality of vehicles 31*a*, . . . , 31*x*. The vehicle diagnostics system 11 may also comprise a user interface (not shown) arrange to receive commands from a user of the one or more applications 12 in the vehicle diagnostics system 11.

The vehicle diagnostics system 11 may be located in a first logical network 10 provided by a local Operating System Environment, OSE (not shown). The OSE may, for example, be an operating system operated and executed locally on a number of servers 13 which is capable of supporting the vehicle diagnostics system 11 with a computation environment in which the vehicle diagnostics system 11 may be execute and perform its operations, i.e. run the one of more applications 12. In other words, this means that the vehicle diagnostics system 11 may be operated within the OSE. Also, this means that the vehicle diagnostics system 11 may be configured with at least one logical network location, such as, e.g. a TCP/IP address, in the first logical network 10. The vehicle diagnostics system 11 may also be configured to use a number of network interfaces of the OSE for communication with the wireless communications network 20. For this purpose, the vehicle diagnostics system 11 is also configured to use the Application Programming Interface, API, library available to it via the OSE. The API library of the OSE may comprise one or more APIs capable of interacting with the network interfaces of the OSE for communication over the wireless communications network 20. The one or more APIs are also capable of supporting network discovery.

The wireless communications network 20 may, for example, comprise an edge node 21, an access point 22, and a cloud server 23. Here, it should be noted that the edge node 21 and the access point 22 may be a single integrated communications node or separate entities depending on the implementation. The wireless communications network 20 may also be connected with and communicating over the Internet.

According to some embodiments, the wireless communications network 20 may comprise a remote WiFi network. In this case, the edge node 21 may configured to use the access point 22, e.g. a WiFi access point, to communicate with wireless devices over the remote WiFi network. The edge node 21 is here capable of bridging a logical network, e.g. extend the first logical network 10 across the wireless communications network 20 to include a separated, but directly connected, logical network, such as, e.g. the second logical network 30 as described below according to some embodiments. In this example, the first logical network 10 and the second logical network 30 are part of the same logical network, although remotely connected. Optionally, according to some embodiments, the wireless communications network 20 may comprise a mobile or wireless telecommunications network. In this case, the access point 22 may be a radio base station. Hence, the access point 22 may be configured to communicate with wireless devices over the wireless telecommunications network. Here, the wireless communications network 20 may also comprise, or be in communications with, a cloud server 23. The cloud server 23 may be configured to initiate and maintain VPN tunnels according to standard VPN tunneling protocols. This means that the cloud server 23 is capable of carrying network data traffic across the boundary of different logical networks, i.e. enable data communication between the first logical network 10 and a remote different logical network, such as, e.g. the second logical network 30 as described below according to some embodiments. In this example, the first logical network 10 and the second logical network 30 are not part of the same logical network, although remotely connected.

Each of the vehicles 31*a*, . . . , 31*x* in the plurality of vehicles comprise an on-board connectivity device, OCD 32*a*, . . . , 32*x*. In some embodiments, the OCDs 32*a*, . . . , 32*x*, may be wireless devices arranged to communicate with the access point 22 in the wireless communications network 20, e.g. over WiFi or via telecommunication. Each OCD

32*a*, . . . , 32*x* may also be integrated with the on-board local network of each vehicle 31*a*, . . . , 31*x*. This means that the OCDs 32*a*, . . . , 32*x* may be configured to communicate with one or more of the on-board components of each vehicle 31*a*, . . . , 31*x* in a secure and trusted manner. The OCDs 32*a*, . . . , 32*x* may be integrated via an on-board Controller Area Network, CAN, bus. The CAN bus is a central part of the on-board local network of each vehicle 31*a*, . . . , 31*x* connecting, and capable of communicating with, one or more of the on-board components of each vehicle 31*a*, . . . , 31*x*. Each of the OCDs 32*a*, . . . , 32*x* has been configured with a logical network location, such as, e.g. an TCP/IP address, in a second logical network 30. Here, it should be noted that the second logical network 30 may be the same logical network as the first logical network 10, e.g. in case of a WiFi network implementation, or may be a logical network that is different and remote from the first logical network 10, e.g. in case of wireless telecommunications network implementation as described above.

According to some embodiments, the vehicle diagnostics system 11 and the OCDs 32*a*, . . . , 32*x* may be configured to establish a logical network connection 40 via the wireless communications network 40. This may be performed as described below with reference to FIGS. 2-5.

As part of developing the embodiments described herein, it has been realized that there are numerous known solutions that allows for a remote vehicle diagnostics system to perform synchronous, real-time vehicle diagnostics towards a remote vehicle.

For example, the standard RP1210c has defined an API that allows an application to interface and communicate with a CAN bus on a vehicle. However, existing applications using the API of the standard RP1210c also have direct connectivity towards the vehicle in the form of a wired connection, such as, USB, Ethernet or PCie. Therefore, these applications does not share the same connectivity issues as described above for a remote testing application attempting to operate via a wireless communications network, such as, the internet or mobile network. Some examples also exists wherein local standard RP1210c adapters may be used in order to locally and directly connect a remote testing application to a CAN bus via WiFi. Also, here the direct communication link over WiFi does not share the same connectivity issues as described above for a remote testing application attempting to operate via a wireless communications network, such as, the internet or mobile network.

However, none of these known solutions addresses the problem of transporting synchronous, real-time data in accordance with a variety of different protocols agnostically between the vehicle and the remote vehicle diagnostics system over a wireless communications network, such as, the internet or mobile networks. Here, the term agnostically is meant to be used in the sense that the method or format of data transmission is irrelevant to the vehicle diagnostics system's function. In other words, the vehicle diagnostics system should be able to receive data in multiple formats or from multiple sources, and still process that data effectively. This is enabled by the embodiments described herein.

Figure 2:
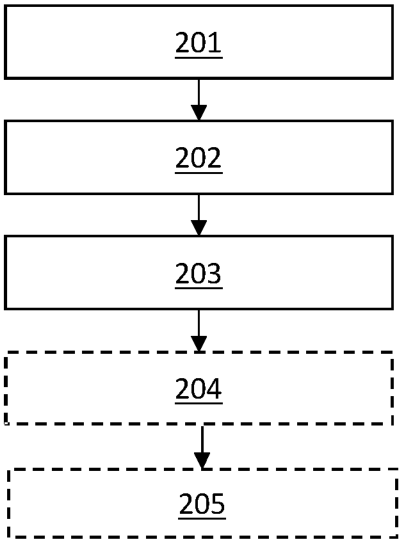
FIG. 2 is a flowchart illustrating embodiments of a method in vehicle diagnostics system.

Examples of embodiments of a method performed by vehicle diagnostics system 11 for enabling synchronous remote vehicle diagnostics for a plurality of vehicles 31*a*, . . . , 31*x*, will now be described with reference to the flowchart depicted in FIG. 2. FIG. 2 is an illustrated example of actions, steps or operations which may be performed by the vehicle diagnostics system 11 as described above with reference to FIG. 1. The method may comprise the following actions, steps or operations.

Action 201. The control unit 110 obtains information indicating that an application 12 in the vehicle diagnostics system 11 is requesting to perform synchronous remote vehicle diagnostics on a selected vehicle 31*a* among the plurality of vehicles 31*a*, . . . , 31*x*. This means that the application 12, or a user of the application 12, may request the vehicle diagnostics system 11 to perform synchronous remote vehicle diagnostics on a specific vehicle among the plurality of vehicles 31*a*, . . . , 31*x*. Thus, the vehicle diagnostics system 11 may receive a request to perform synchronous remote vehicle diagnostics on a selected vehicle 31*a* via the application 12.

Action 202. After obtaining the information in Action 201, the vehicle diagnostics system 11 determines, by using an Application Programming Interface, API, available to the vehicle diagnostics system 11, a logical network location of an on-board connectivity device, OCD 32*a*, integrated in an on-board network of the selected vehicle 31*a*. This means that the vehicle diagnostics system 11 may advantageously use the API library of the OSE in which the vehicle diagnostics system 11 is operating to discover a logical network location, e.g. a TCP/IP address, of the OCD 32*a* in the selected vehicle 31*a* over a wireless communications network 20. In some embodiments, the API may be adapted to communicate with the OCD 32*a* by using API libraries available to the vehicle diagnostics system 11 capable of supporting network discovery. In other words, the API library may be used to interact with the network interfaces available to the vehicle diagnostics system 11 in the OSE to determine logical network location of the OCD 32*a*, i.e. perform discovery of the logical network location of the OCD 32*a*.

In some embodiments, in case the logical network location of the vehicle diagnostics system 11 and the logical network location of the OCD 32*a* belongs to the same logical network 10, 30, the vehicle diagnostics system 11 may determine the logical network location of the OCD 32*a* and establish the logical network connection 40 via an edge node 21 in the wireless communications network 20, wherein the edge node 201 is adapted to enable communication between separate logical network locations belonging to the same logical network. For example, the vehicle diagnostics system 11 may, in this cases when the one or more APIs and the OCD 32*a* is located on the same logical network, use the one or more APIs to perform the discovery of the logical network location of the OCDs 32*a* via the edge node 21. In some embodiments, this may be performed by broadcasting to all client and hosts contactable on the logical network. Alternatively, a multicast transmission to a subset of client and hosts subscribing to certain network groups may be performed. Another option is to perform a unicast transmission to a specific client or host, wherein the specific client or host is responsible for receiving notifications or registrations for the selected vehicle 31*a* as a whole, or certain processes or system in the selected vehicle 31*a*. It should be noted that multicast or broadcast transmissions are unable to, on their own, transit the boundary between the logical network locations in the same logical network. This is facilitated by the edge node 21, i.e. the multicast or broadcast discovery transmissions and responses may be received by the edge node 21 and then communicated to the OCD 31*a* and the one or more APIs used by the vehicle diagnostics system 11, respectively. This may, for example, be performed by using a network protocol, such as, e.g. a Representational State Transfer, REST, protocol.

Optionally, according to some embodiments, in case the logical network location of the vehicle diagnostics system 11 and the logical network location of the OCD 32*a* belongs to separate logical networks 10, 30, the vehicle diagnostics system 11 may determine the logical network location of the OCD 32*a* and establish the logical network connection 40 via a cloud server 31 in or connected to a wireless communications network 20, wherein the cloud server 23 is adapted to enable communications between the separate logical networks using virtual tunneling protocols. For example, the vehicle diagnostics system 11 may, in this cases when the one or more APIs and the OCD 32*a* is located on completely separate logical networks, use the one or more APIs to perform the discovery of the logical network location of the OCDs 32*a* via the cloud server 23. The cloud server 23 may here initiate and maintain a tunnel, such as, e.g. a Virtual Private Network, VPN, tunnel, towards the OCD 32*a*, e.g. via a Virtual Delivery Agent, VDA, running in the OCD 32*a*. This means that the vehicle diagnostics system 11 may use the cloud server 23 to carry network data traffic across the logical network boundary between the separate logical networks, i.e. the first logical network 10 and the second logical network 30. Here, the vehicle diagnostics system 11 may use the one or more APIs to request the cloud server 23 to create and maintain the tunnel towards the OCD 32*a*, and e.g. a specific VDA therein, on behalf of the application 12 running in the vehicle diagnostics system 11.

Here, it may also be noted that any communication between the vehicle diagnostics system 11 and the OCD 32*a*, such as, e.g. discovery messages, notifications or registrations, may preferably be made in a format that is secure. For example, by using an authentication and integrity protection mechanism according to Domain Name System Security Extensions, DNSSEC. According to another example, this may be made by transmitting the discovery messages, notifications or registrations over a Transport Layer Security, TLS, tunnel or an Internet Protocol Security, IPSEC, tunnel. Optionally, the discovery messages, notifications or registrations may also comprise within itself, or trigger, an authentication method, such as, an Open Authorization, OAUTH, protocol.

Action 203. After the determination in Action 202, the vehicle diagnostics system 11 establishes, using the API, a logical network connection 40 between the determined logical network location of the OCD 32*a* and the logical network location of the vehicle diagnostics system 11 over a wireless communications network 20. This advantageously enables the vehicle diagnostics system 11 to perform synchronous remote vehicle diagnostics of the selected vehicle 31*a* based on synchronous data information from the OCD 32*a* originating from on-board vehicle components 33*a*, . . . , 33*x* via the on-board network of the selected vehicle 31*a*.

Action 204. Optionally, after the establishment of the logical network connection 40, the vehicle diagnostics system 11 may transmit information indicating that the vehicle diagnostics system 11 is requesting to perform synchronous remote vehicle diagnostics on the vehicle 31*a* over the established logical network connection 40. This may, for example, be performed in response to obtains information indicating that an application 12 in the vehicle diagnostics system 11 is requesting to perform synchronous remote vehicle diagnostics on a selected vehicle 31*a* among the plurality of vehicles 31*a*, . . . , 31*x* in Action 201.

Action 205. After transmitting the information in Action 204, the vehicle diagnostics system 11 may perform synchronous remote vehicle diagnostics of the selected vehicle 31*a* via the established logical network connection 40 based on synchronous data information from the OCD 32*a* originating from on-board vehicle components 33*a*, . . . , 33*x* via the on-board network of the selected vehicle 31*a*. This means that the vehicle diagnostics system 11 may receive synchronous data information from on-board vehicle components 33*a*, . . . , 33*x* of the selected vehicle 31*a* via the OCD 32*a*, and perform synchronous remote vehicle diagnostics based thereon.

Figure 3:
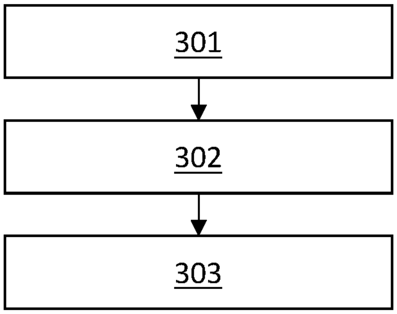
FIG. 3 is a flowchart illustrating embodiments of a method in an on-board connectivity device, OCD.

Examples of embodiments of a method performed by an on-board connectivity device, OCD 32*a*, for enabling synchronous remote vehicle diagnostics to be performed on a vehicle 31*a*, wherein the OCD 32*a* is integrated in an on-board network of the vehicle 31*a* interfacing with on-board vehicle components 33*a*, . . . , 33*x*, will now be described with reference to the flowchart depicted in FIG. 3. FIG. 3 is an illustrated example of actions, steps or operations which may be performed by the OCD 32*a* as described above with reference to FIG. 1. The method may comprise the following actions, steps or operations.

Action 301. The OCD 32*a* establishes a logical network connection 40 between the logical network location of the OCD 32*a* in a wireless communications network 20 and a logical network location of the vehicle diagnostics system 11. This may be performed by the OCD 32*a* mutually in cooperation with the vehicle diagnostics system 11 in Action 203, e.g. by exchanging messages for setting up the logical network connection 40. In some embodiments, in case the logical network location of the vehicle diagnostics system 11 and the logical network location of the OCD 32*a* belongs to the same logical network 10, 30, the OCD 32*a* may establish the logical network connection 40 via an edge node 21 of the wireless communications network 20, wherein the edge node 21 is adapted to enable communication between separate logical network locations belonging to the same logical network. Optionally, in some embodiments, in case the logical network location of the vehicle diagnostics system 11 and the logical network location of the OCD (32*a*) belongs to separate logical networks 10, 30, the OCD 32*a* may establish the logical network connection 40 via a cloud server 31 in or connected to a wireless communications network 20, wherein the cloud server 23 is adapted to enable communications between the separate logical networks using virtual tunneling protocols.

Action 302. After the establishment of the logical network connection 40, the OCD 32*a* receives information indicating that a vehicle diagnostics system 11 is requesting to perform synchronous remote vehicle diagnostics on the vehicle 31*a* over the established logical network connection 40. This may, for example, be a request originating from the application 12 in the vehicle diagnostics system 11 indicating the that application 12, or user thereof, is requesting to perform synchronous remote vehicle diagnostics on the vehicle 31*a*, and therefore require the OCD 32*a* to provide synchronous data information from on-board vehicle components 33*a*, . . . , 33*x* of the vehicle 31*a*.

Action 303. After the receiving the information in Action 302, the OCD 32*a* provides, to the vehicle diagnostics system 11 via the established logical network connection 40, synchronous data information from the on-board vehicle components 33*a*, . . . , 33*x* obtained via the on-board network of the vehicle 31*a*. This enables the application 12 in the vehicle diagnostics system 11 to perform synchronous remote vehicle diagnostics on the vehicle 31*a*.

Figure 4:
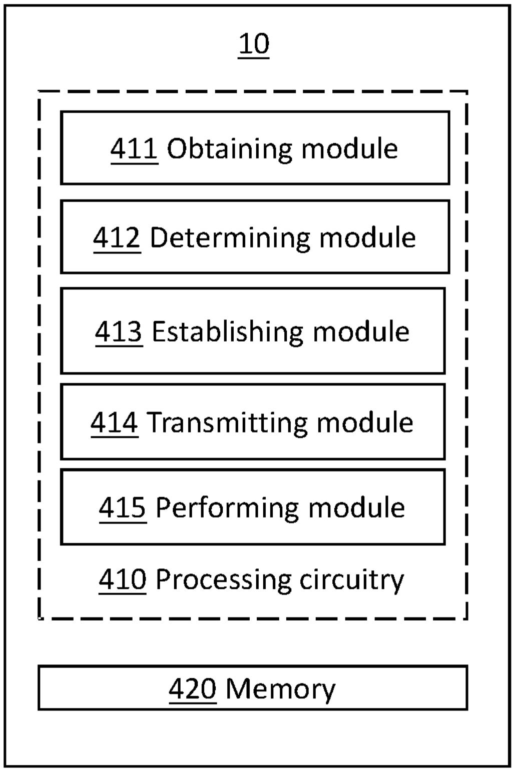
FIG. 4 is a block diagram depicting embodiments of a vehicle diagnostics system.

To perform the method actions for enabling synchronous remote vehicle diagnostics for a plurality of vehicles 31*a*, . . . , 31*x*, the vehicle diagnostics system 11 may comprise the following arrangement depicted in FIG. 4. FIG. 4 shows a schematic block diagram of embodiments of the vehicle diagnostics system 11. It should also be noted that, although not shown in FIG. 4, known conventional features for operating a vehicle diagnostics system 11, such as, for example, a connection to a power source, e.g. a battery or the mains, may be assumed to be comprised in the vehicle diagnostics system 11, but is not shown or described in any further detail in regards to FIG. 4.

The vehicle diagnostics system 11 may comprise processing circuitry 410 and a memory 420. It should also be noted that some or all of the functionality described in the embodiments above as being performed by the vehicle diagnostics system 11 may be provided by the processing circuitry 410 executing instructions stored on a computer-readable medium, such as, e.g. the memory 420 shown in FIG. 4. Alternative embodiments of the vehicle diagnostics system 11 may comprise additional components, such as, for example, an obtaining module 411, a determining module 412, an establishing module 413, a transmitting module 414, and a performing module 415, whereby each module may be configured and responsible for providing its dedicated functionality to support the embodiments described herein. Here, it should be noted that the obtaining module 411 and the transmitting module 414 may form part of the same I/O module or transceiver for receiving and transmitting network data information over a logical network.

The vehicle diagnostics system 11 or processing circuitry 410 is configured to, or may comprise the obtaining module 413 being configured to, obtain information indicating that an application 12 in the vehicle diagnostics system 11 is requesting to perform synchronous remote vehicle diagnostics on a selected vehicle 31*a* among the plurality of vehicles 31*a*, . . . , 31*x*. Also, the vehicle diagnostics system 11 or processing circuitry 410 is configured to, or may comprise the determining module 413 being configured to, determine, by using an Application Programming Interface, API, available to the vehicle diagnostics system 11, a logical network location of an on-board connectivity device, OCD 32*a*, integrated in an on-board network of the selected vehicle 31*a*. Further, the vehicle diagnostics system 11 or processing circuitry 410 is configured to, or may comprise the establishing module 414 being configured to, establish, using the API, a logical network connection 40 between the determined logical network location of the OCD 32*a* and the logical network location of the vehicle diagnostics system 11 over a wireless communications network 20.

In some embodiments, the vehicle diagnostics system 11 or processing circuitry 410 may be configured to, or may comprise the transmitting module 414 being configured to, transmit, to the OCD 32*a*, information indicating that the vehicle diagnostics system 11 is requesting to perform synchronous remote vehicle diagnostics on the vehicle 31*a* over the established logical network connection 40. Here, the vehicle diagnostics system 11 or processing circuitry 410 may also be configured to, or may comprise the performing module 415 being configured to, perform synchronous remote vehicle diagnostics of the selected vehicle 31*a* via the established logical network connection 40 based on synchronous data information from the OCD 32*a* originating from on-board vehicle components 33*a*, . . . , 33*x* via the on-board network of the selected vehicle 31*a*. Also, in some embodiments, the API may be adapted to communicate with the OCD 32*a* by using API libraries available to the vehicle diagnostics system 11 capable of supporting network discovery.

Further, in some embodiments, in case the logical network location of the vehicle diagnostics system 11 and the logical network location of the OCD 32*a* belongs to the same logical network 10, 30, the vehicle diagnostics system 11 or processing circuitry 410 may be further configured to, or may comprise the determining module 413 being further configured to, determine the logical network location of the OCD 32*a* via an edge node 21 in the wireless communications network 20, wherein the edge node 21 is adapted to enable communication between separate logical network locations belonging to the same logical network. Here, the vehicle diagnostics system 11 or processing circuitry 410 may also be further configured to, or may comprise the establishing module 413 being further configured to, establish the logical network connection 40 via the edge node 21 in the wireless communications network 20.

Optionally, in some embodiments, in case the logical network location of the vehicle diagnostics system 11 and the logical network location of the OCD 32*a* belongs to separate logical networks 10, 30, the vehicle diagnostics system 11 or processing circuitry 410 may be further configured to, or may comprise the determining module 413 being further configured to, determine the logical network location of the OCD 32*a* via a cloud server 31 in or connected to the wireless communications network 20, wherein the cloud server 23 is adapted to enable communications between the separate logical networks using virtual tunneling protocols. Here, the vehicle diagnostics system 11 or processing circuitry 410 may also be further configured to, or may comprise the establishing module 413 being further configured to, establish the logical network connection 40 via the cloud server 31 in or connected to the wireless communications network 20.

Furthermore, the embodiments for enabling synchronous remote vehicle diagnostics for a plurality of vehicles 31*a*, . . . , 31*x* described above may be at least partly implemented through one or more processors, such as, the processing circuitry 410 in the vehicle diagnostics system 11 depicted in FIG. 4, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 410 in the vehicle diagnostics system 11. The data carrier, or computer readable medium, may be one of an electronic signal, optical signal, radio signal or computer-readable storage medium. The computer program code may e.g. be provided as pure program code in the vehicle diagnostics system 11 or on a server and downloaded to the vehicle diagnostics system 11. Thus, it should be noted that the functions of the vehicle diagnostics system 11 may in some embodiments be implemented as computer programs stored in memory 420 in FIG. 4, e.g. a computer readable storage unit, for execution by processors or processing modules, e.g. the processing circuitry 410 in the vehicle diagnostics system 11 of FIG. 4.

Those skilled in the art will also appreciate that the processing circuitry 410 and the memory 420 described above may refer to a combination of analog and digital circuits, and/or one or more processors configured with software and/or firmware, e.g. stored in a memory, that when executed by the one or more processors such as the processing circuitry 410 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 5:
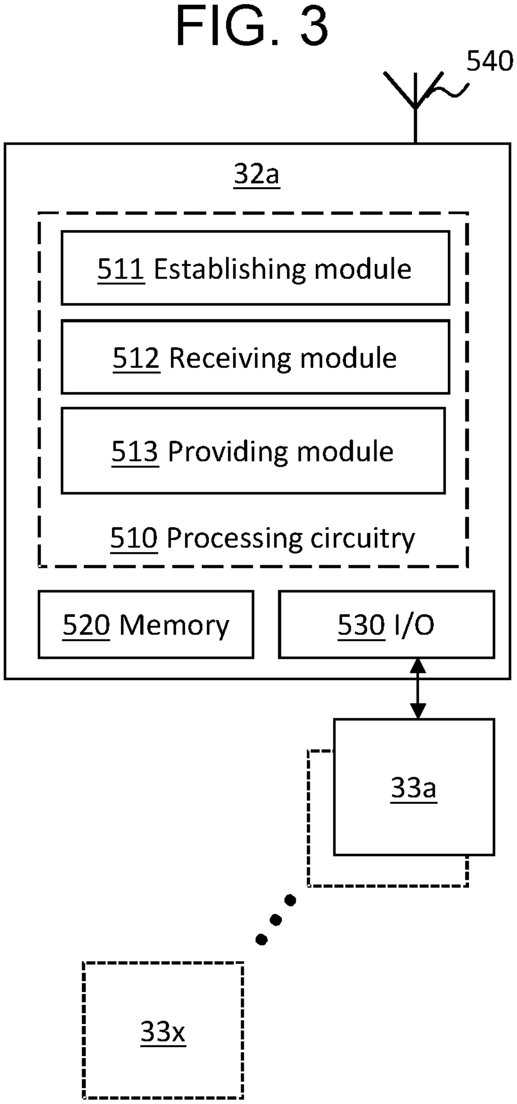
FIG. 5 is a block diagram depicting embodiments of an on-board connectivity device, OCD.

To perform the method actions for enabling synchronous remote vehicle diagnostics to be performed on a vehicle 31*a*, the OCD 32*a* may comprise the following arrangement depicted in FIG. 5. Here, the OCD 32*a* is integrated in an on-board network of the vehicle 31*a* interfacing with the on-board vehicle components 33*a*, . . . , 33*x*, e.g. via an I/O module 530. The I/O module 530 may be connected to or be integrated with the CAN bus on-board the vehicle 31*a*. FIG. 5 shows a schematic block diagram of embodiments of the OCD 32*a*. It should also be noted that, although not shown in FIG. 5, known conventional features for operating the OCD 32*a*, such as, for example, a connection to a power source, e.g. a battery or other on-board power source, may be assumed to be comprised in the OCD 32*a*, but is not shown or described in any further detail in regards to FIG. 5.

The OCD 32*a* may comprise processing circuitry 510 and a memory 520. It should also be noted that some or all of the functionality described in the embodiments above as being performed by the OCD 32*a* may be provided by the processing circuitry 510 executing instructions stored on a computer-readable medium, such as, e.g. the memory 520 shown in FIG. 5. Alternative embodiments of the OCD 32*a* may comprise additional components, such as, for example, an establishing module 511, a receiving module 512, and a providing module 513, whereby each module may be configured and responsible for providing its dedicated functionality to support the embodiments described herein.

The OCD 32*a* or processing circuitry 510 is configured to, or may comprise the establishing module 511 being configured to, obtain establish a logical network connection 40 between the logical network location of the OCD 32*a* in a wireless communications network 20 and a logical network location of the vehicle diagnostics system 11 in the wireless communications network 20. Also, the OCD 32*a* or processing circuitry 410 is configured to, or may comprise the receiving module 512 being configured to, receive information indicating that a vehicle diagnostics system 11 is requesting to perform synchronous remote vehicle diagnostics on the vehicle 31*a* over the established logical network connection 40. Further, the OCD 32*a* or processing circuitry 410 is configured to, or may comprise the providing module 513 being configured to, provide, to the vehicle diagnostics system 11 via the established logical network connection 40, synchronous data information from the on-board vehicle components 33*a*, . . . , 33*x* obtained via the on-board network of the vehicle 31*a*.

In some embodiments, in case the logical network location of the vehicle diagnostics system 11 and the logical network location of the OCD 32*a* belongs to the same logical network 10, 30, the OCD 32*a* or processing circuitry 510 may be configured to, or may comprise the establishing module 511 being configured to, establish the logical network connection 40 via an edge node 21 of the wireless communications network 20, wherein the edge node 21 is adapted to enable communication between separate logical network locations belonging to the same logical network. Optionally, in some embodiments, in case the logical network location of the vehicle diagnostics system 11 and the logical network location of the OCD 32*a* belongs to separate logical networks 10, 30, the OCD 32*a* or processing circuitry 510 may be configured to, or may comprise the establishing module 511 being configured to, establish the logical network connection 40 via a cloud server 31 in or connected to a wireless communications network 20, wherein the cloud server 23 is adapted to enable communications between the separate logical networks using virtual tunneling protocols.

Furthermore, the embodiments for enabling synchronous remote vehicle diagnostics to be performed on a vehicle 31*a* described above may be at least partly implemented through one or more processors, such as, the processing circuitry 510 in the OCD 32*a* depicted in FIG. 5, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 510 in the OCD 32*a*. The data carrier, or computer readable medium, may be one of an electronic signal, optical signal, radio signal or computer-readable storage medium. The computer program code may e.g. be provided as pure program code in the OCD 32*a* or on a server and downloaded to the OCD 32*a*. Thus, it should be noted that the functions of the OCD 32*a* may in some embodiments be implemented as computer programs stored in memory 520 in FIG. 5, e.g. a computer readable storage unit, for execution by processors or processing modules, e.g. the processing circuitry 510 in the OCD 32*a* of FIG. 5.

Those skilled in the art will also appreciate that the processing circuitry 510 and the memory 520 described above may refer to a combination of analog and digital circuits, and/or one or more processors configured with software and/or firmware, e.g. stored in a memory, that when executed by the one or more processors such as the processing circuitry 510 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems and computer program products. It should be appreciated that the example embodiments presented herein may be practiced in any combination with each other. It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware. It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes. The embodiments herein are not limited to the above described preferred embodiments. Various alternatives, modifications and equivalents may be used. Therefore, the above embodiments should not be construed as limiting.

The invention claimed is:

1. A method performed by vehicle diagnostics system for enabling synchronous remote vehicle diagnostics for a plurality of vehicles, the method comprising:

obtaining information indicating that an application in the vehicle diagnostics system is requesting to perform synchronous remote vehicle diagnostics on a selected vehicle among the plurality of vehicles;

determining a logical network location of an on-board connectivity device (OCD) integrated in an on-board network of the selected vehicle, wherein the logical network location is determined by using an Application Programming Interface (API) available to the vehicle diagnostics system and wherein the API is adapted to communicate with the OCD by using API libraries available to the vehicle diagnostics system capable of supporting network discovery; and establishing, using the API, a logical network connection between the determined logical network location of the OCD and the logical network location of the vehicle diagnostics system over a wireless communications network, wherein, when the logical network location of the vehicle diagnostics system and the logical network location of the OCD belongs to the same logical network, the determining and establishing is further performed via an edge node in the wireless communications network, wherein the edge node is adapted to enable communication between separate logical network locations belonging to the same logical network, and wherein said network discovery is performed by: broadcasting to all client and hosts contactable on the logical network, or performing a multicast transmission to a subset of client and hosts subscribing to certain network groups, or performing a unicast transmission to a specific client or host, wherein the specific client or host is responsible for receiving notifications or registrations for the selected vehicle as a whole, or certain processes or system in the selected vehicle.

2. The method according to claim 1, further comprising:

transmitting, to the OCD, information indicating that the vehicle diagnostics system is requesting to perform synchronous remote vehicle diagnostics on the vehicle over the established logical network connection;

performing synchronous remote vehicle diagnostics of the selected vehicle via the established logical network connection based on synchronous data information from the OCD originating from on-board vehicle components via the on-board network of the selected vehicle.

3. The method according to claim 1, wherein, when the logical network location of the vehicle diagnostics system and the logical network location of the OCD belongs to separate logical networks, the determining and establishing is further performed via a cloud server in or connected to a wireless communications network, wherein the cloud server is adapted to enable communications between the separate logical networks using virtual tunneling protocols.

4. A non-transitory computer program carrier storing program code for performing the method of claim 1 when said computer program code is run in a processing circuitry of a vehicle diagnostics system.

5. The non-transitory computer program carrier according to claim 4, wherein the computer program code carrier is computer-readable storage medium.

6. A vehicle diagnostics system for enabling synchronous remote vehicle diagnostics for a plurality of vehicles, the vehicle diagnostics system being configured to:

obtain information indicating that an application in the vehicle diagnostics system is requesting to perform synchronous remote vehicle diagnostics on a selected vehicle among the plurality of vehicles, determine a logical network location of an on-board connectivity device (OCD) integrated in an on-board network of the selected vehicle, wherein the logical network location is determined by using an Application Programming Interface (API) available to the vehicle diagnostics system and wherein the API is adapted to communicate with the OCD by using API libraries available to the vehicle diagnostics system capable of supporting network discovery, and establish, using the API, a logical network connection between the determined logical network location of the OCD and the logical network location of the vehicle diagnostics system over a wireless communications network, wherein, in case the logical network location of the vehicle diagnostics system and the logical network location of the OCD belongs to the same logical network, the vehicle diagnostics system is further configured to determine the logical network location of the OCD and establish the logical network connection via an edge node in the wireless communications network, wherein the edge node is adapted to enable communication between separate logical network locations belonging to the same logical network, and wherein the vehicle diagnostics system is configured to perform said network discovery by: broadcasting to all client and hosts contactable on the logical network, or performing a multicast transmission to a subset of client and hosts subscribing to certain network groups, or performing a unicast transmission to a specific client or host, wherein the specific client or host is responsible for receiving notifications or registrations for the selected vehicle as a whole, or certain processes or system in the selected vehicle.

7. The vehicle diagnostics system according to claim 6, further configured to transmit, to the OCD, information indicating that the vehicle diagnostics system is requesting to perform synchronous remote vehicle diagnostics on the vehicle over the established logical network connection, and perform synchronous remote vehicle diagnostics of the selected vehicle via the established logical network connection based on synchronous data information from the OCD originating from on-board vehicle components via the on-board network of the selected vehicle.

8. The vehicle diagnostics system according to claim 6, wherein, in case the logical network location of the vehicle diagnostics system and the logical network location of the OCD belongs to separate logical networks, the vehicle diagnostics system is further configured to determine the logical network location of the OCD and establish the logical network connection via a cloud server in or connected to the wireless communications network, wherein the cloud server is adapted to enable communications between the separate logical networks using virtual tunneling protocols.

* * * * *